US010860509B1

United States Patent
Watkins et al.

(10) Patent No.: US 10,860,509 B1
(45) Date of Patent: Dec. 8, 2020

(54) MULTI-DEVICE BURST UPDATE METHOD

(71) Applicant: TEXAS INSTRUMENTS INCORPORATED, Dallas, TX (US)

(72) Inventors: Gregory Alan Watkins, Plano, TX (US); Michael Joseph Koltun, IV, Dallas, TX (US); Nagesh Narayana Swamy, Bangalore (IN); Randall Stephen Preissig, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/519,507

(22) Filed: Jul. 23, 2019

(51) Int. Cl.
*G06F 13/28* (2006.01)
*G06F 13/42* (2006.01)
*G06F 13/364* (2006.01)

(52) U.S. Cl.
CPC ............ *G06F 13/28* (2013.01); *G06F 13/364* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| 4,291,406 | A  | * | 9/1981 | Bahl   | H04L 1/0054 714/787 |
| 2005/0114463 | A1 | * | 5/2005 | Lee    | G06F 1/24 709/208 |
| 2008/0126909 | A1 | * | 5/2008 | Talbot | G06F 11/1076 714/758 |
| 2008/0244132 | A1 | * | 10/2008 | Li    | G06F 13/28 710/110 |

* cited by examiner

*Primary Examiner* — Idriss N Alrobaye
*Assistant Examiner* — Dayton Lewis-Taylor
(74) *Attorney, Agent, or Firm* — Mark Allen Valetti; Charles A. Brill; Frank D. Cimino

(57) ABSTRACT

One example includes a non-transitory storage medium storing a set of instructions, which upon being implemented by a processing element cause the processing element to initiate a burst update communication session from a master microcontroller device on a bus and provide a burst address in the burst update communication session from the master microcontroller device to slave microcontroller devices on the bus. The slave microcontroller devices on the bus can have a burst address to concurrently activate the slave microcontroller devices to read data. The instructions can also cause the processing element to provide burst data corresponding to a burst update from the master microcontroller device to the slave microcontroller devices on the bus based on the burst address, and conclude the burst update communication session from the master microcontroller device to the slave microcontroller devices on the bus.

17 Claims, 5 Drawing Sheets

US 10,860,509 B1

MULTI-DEVICE BURST UPDATE METHOD

TECHNICAL FIELD

This disclosure relates generally to electronic systems, and more specifically to a multi-device burst update method.

BACKGROUND

A number of computer systems implement microcontrollers configured to process inputs and outputs (I/O). Some designs implement the processing of the I/O based on I/O associated with other microcontrollers. As such, it may be necessary for two microcontrollers to communicate information bi-directionally. One example of microcontrollers that provide bi-directional data communication are Inter-Integrated Circuit (I2C—also referred to as "I$^2$C" and "IIC") microcontrollers. An I2C microcontroller system implements bi-directional data communication between a master device and at least one slave device. As an example, the slave devices can be configured to control a peripheral component associated with a computer device (e.g., a peripheral I/O port, such as a universal serial bus (USB) port). As such, the master device can be configured to provide configuration data to the slave device(s), such as including patch information (e.g., firmware update information).

SUMMARY

One example includes a non-transitory storage medium storing a set of instructions, which upon being implemented by a processing element cause the processing element to initiate a burst update communication session from a master microcontroller device on a bus and provide a burst address in the burst update communication session from the master microcontroller device to slave microcontroller devices on the bus. The slave microcontroller devices on the bus can have a burst address to concurrently activate the slave microcontroller devices to read data. The instructions can also cause the processing element to provide burst data corresponding to a burst update from the master microcontroller device to the slave microcontroller devices on the bus based on the burst address, and conclude the burst update communication session from the master microcontroller device to the slave microcontroller devices on the bus.

Another example includes an Inter-Integrated Circuit (I2C) communication system. The system includes a plurality of I2C slave devices. Each of the I2C slave devices includes a communications port accessible via a common burst address. The system also includes an I2C master device coupled to the I2C slave devices by a bus, the master I2C device being configured to initiate a burst update communication session to each of the I2C slave devices on the bus based on the common burst address. The burst update communication session includes transmitting burst data corresponding to a burst update to each of the I2C slave devices on the bus concurrently during the burst update communication session.

Another example includes a power controller. The power controller includes a bus and a plurality of Inter-Integrated Circuit (I2C) slave devices coupled to the bus. Each of the I2C slave devices includes a communications port accessible via a common burst address. The power controller also includes an I2C master device coupled to the bus. The master I2C bus can be configured to initiate a burst update communication session to each of the I2C slave devices on the bus based on the common burst address. The burst update communication session includes transmitting burst data corresponding to a burst update to each of the I2C slave devices concurrently during the burst update communication session.

DETAILED DESCRIPTION

Figure 1:
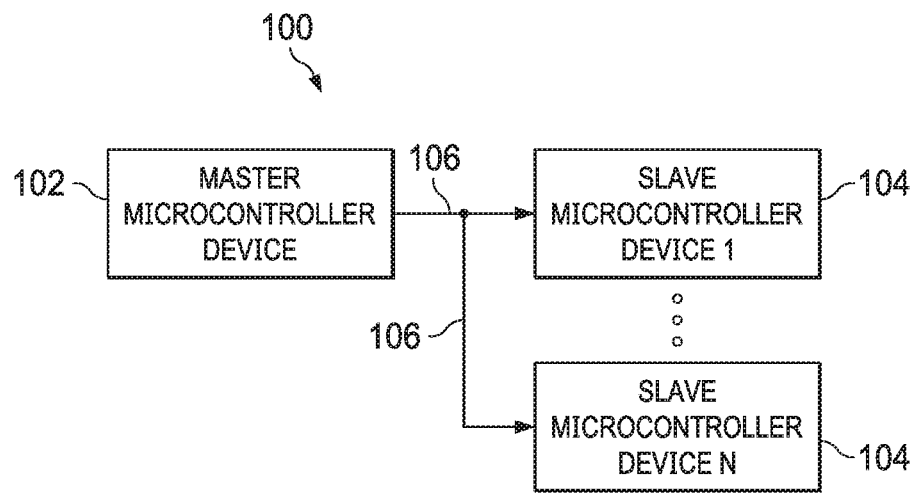
FIG. 1 illustrates an example of a communication system.

This disclosure relates generally to electronic circuits and systems, and more specifically to a multi-device burst update method. The update method relates to a communication system, such as an Inter-Integrated Circuit (I2C) communication system that includes a master microcontroller device and a plurality of slave microcontroller devices that are communicatively coupled on a bus (e.g., a two-wire bus that is suitable for I2C communications). The communication system, such as the I2C communication system, can be implemented, for example, in a peripheral input/output (I/O) port on an electronic device, such as a power controller for a universal serial bus (USB) port of a laptop or other type of computer device. However, the communication system is not limited to power controller applications, and can be implemented in any of a variety of applications that provide communications.

The master microcontroller device can be configured to provide a burst update (e.g., a patch update or configuration update) for the slave microcontroller devices concurrently in a burst update communication session based on accessing each of the slave microcontroller devices through a burst address that is associated with all of the slave microcontroller devices. For example, the master microcontroller device can initiate the burst update communication session by providing the burst address in a communication stream, such that each of the slave microcontroller devices can switch to a data receive mode in response to access by the burst address. The master microcontroller device can then transmit burst data to each of the slave microcontroller devices concurrently over the bus, and can conclude the burst update communication session to the slave microcontroller devices. The slave microcontroller devices can each store the burst data, as it is received, can determine the burst data that is intended for the respective slave microcontroller device (e.g., during or after the burst update communication session), and discard the rest of the burst data.

For example, each of the slave microcontroller devices can include a first unique address and a second configurable address. The master microcontroller device can initiate address configuration communication sessions to each of the slave microcontroller devices in a sequence using the first unique address. During each of the address configuration communication sessions, the master microcontroller device can provide address configuration data to the respective one of the slave microcontroller devices, with the address configuration data including instructions for the respective slave microcontroller device to set the second configurable address to the burst address. Therefore, in response to the sequence of address configuration communication sessions to each of the respective slave microcontroller devices, each of the slave microcontroller devices can have the second configurable address set to the burst address to allow the master microcontroller device to subsequently initiate a burst update communication session to each of the slave microcontroller devices concurrently.

For example, in typical master/slave communication systems (e.g., I2C communication systems), patch updates can involve sending patch information in chunks of approximately 64B messages, but a patch bundle can be approximately 12 kB in size, which can result in long patch transfer times. In such a typical master/slave communication system that includes multiple slave devices, each such slave device is updated individually, which can result in a significant amount of time to update each of the slave devices. Therefore, in order to satisfy the demand for a much faster patch update time, such as after boot-up of the associated computer system, the methodology of providing burst updates, as described herein, can provide for a significantly faster time for updating all of the slave devices on a master/slave communication system.

FIG. 1 illustrates an example of a communication system 100. The communication system 100 can be implemented in any of a variety of communications applications that implement microcontrollers in a master/slave manner. The communication system 100 includes a master microcontroller device 102 and a plurality N of slave microcontroller devices 104, where N has a quantity greater than one. The master microcontroller device 102 and the slave microcontroller devices 104 are coupled by a bus 106.

As an example, the master microcontroller device 102 may provide periodic updates to the slave microcontroller devices 104. For example, the updates may include changes to the firmware of the respective slave microcontroller devices 104, such as including patch updates to provide new features for the respective slave microcontroller devices 104 (e.g., for control of the associated devices for which the slave microcontroller devices 104 provide control) and/or configuration updates to provide changes or corrections to the existing features for the respective slave microcontroller devices 104. As described herein, the master microcontroller device 102 can be configured to provide a burst update to each of the slave microcontroller devices 104 concurrently. As described herein, the term "burst update" refers to a concurrent update that includes at least one of a patch update and a configuration update to all of the slave microcontroller devices 104 on the bus 106 from the master microcontroller device 102. By using such burst update, transmission of overhead data and other data that is common to all of the slave microcontroller devices 104 is not repeated, as it is included in individual updates provided to slave microcontroller devices in a sequence in typical communication systems. Therefore, the burst update provided by the master microcontroller device 102 to the slave microcontroller devices 104 is significantly faster and more efficient than sequential updates implemented in typical communication systems.

As an example, the master microcontroller device 102 can be configured to provide the burst update to each of the slave microcontroller devices 104 concurrently in a burst update communication session based on accessing each of the slave microcontroller devices 104 through a burst address. As described herein, the term "burst address" refers to a common non-unique address that is associated with all of the slave microcontroller devices 104. For example, the master microcontroller device 104 can initiate the burst update communication session by providing the burst address in a communication stream across the bus 106, such that each of the slave microcontroller devices 104 can switch from a normal operating mode to a data receive mode in response to access by the burst address. The master microcontroller device 102 can then transmit burst data to each of the slave microcontroller devices 104 concurrently over the bus 106, and can conclude the burst update communication session to the slave microcontroller devices 104.

Figure 2:
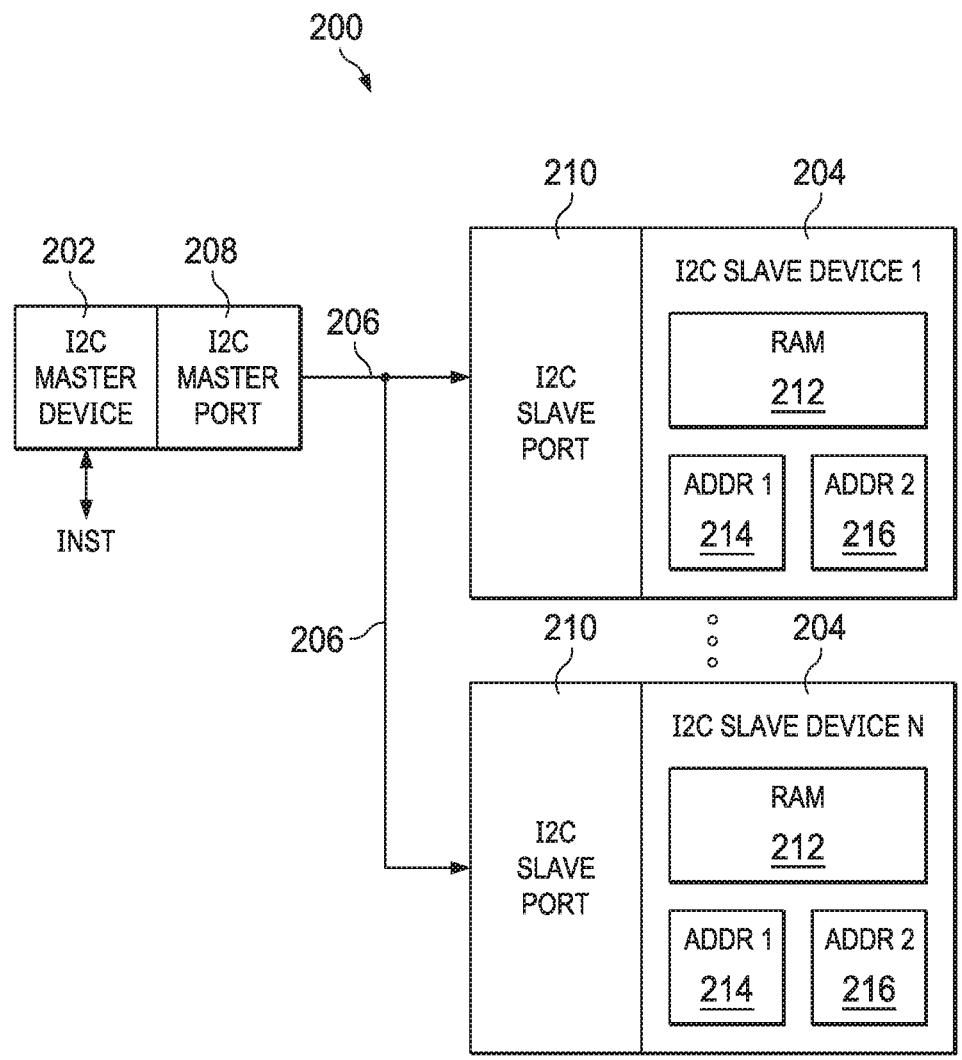
FIG. 2 illustrates an example of an I2C communication system.

FIG. 2 illustrates an example of an I2C communication system 200. The I2C communication system 200 can be implemented in any of a variety of I2C communications applications. For example, the I2C communication system 200 can be implemented in a power controller for a peripheral I/O port (e.g., a universal serial bus (USB)) of an electronic device (e.g., a laptop computer). The following examples describe an I2C communication system 200. However, it is to be understood that the methods and systems described herein are not limited to an I2C communication system, but can be implemented for any microcontroller communication system in which a master device communicates with multiple slave devices.

The I2C communication system 200 includes an I2C master device 202 and a plurality N of I2C slave devices 204, where N has a quantity greater than one. As an example, each of the I2C slave devices 204 can correspond to a power controller for a separate respective USB device of a computer system. The I2C master device 202 and the I2C slave devices 204 are coupled by a bus 206, such as a two-wire bus suitable for an I2C communications protocol. In the example of FIG. 2, the I2C master device 202 includes an I2C master port 208 corresponding to a communication port coupled to the bus 206, and each of the I2C slave devices 204 includes an I2C slave port 210 corresponding to a communication port coupled to the bus 206. The I2C master device 202 and the I2C slave devices 204 can thus communicate over the bus 206 based on the I2C communications protocol.

As an example, the I2C master device 202 may provide periodic updates to the I2C slave devices 204. For example, the updates may include changes to the firmware of the respective I2C slave devices 204, such as including patch updates to provide new features for the respective I2C slave devices 204 (e.g., for control of the associated devices for which the I2C slave devices 204 provide control) and/or configuration updates to provide changes or corrections to the existing features for the respective I2C slave devices 204. In the example of FIG. 2, the I2C master device 202 is demonstrated as communicating through a signal "INST" with another device. For example, the signal INST can correspond to instantiation instructions provided to the I2C master device 202, such as for providing the periodic updates (e.g., a burst update, as described herein) to the I2C master device 202. The signal INST can also include status information from the I2C master device 202 to the other device (e.g., to indicate a state or status of the I2C communication system 200). The signal INST can be communicated, for example, on one or more dedicated pins of the I2C master device 202, or can be communicated across the bus 206. For example, the other device can correspond to another computing or processing device in the associated computer system, such as another controller, a processor, an application specific integrated circuit (ASIC), or any of a variety of other devices that may provide a higher level of control over the I2C communication system 200.

As described herein, the I2C master device 202 can be configured to provide a burst update to each of the I2C slave devices 204 concurrently. Therefore, the overhead data and data that is common to all of the I2C slave devices 204 is not repeated, as it is in individual updates provided to I2C slave devices in a sequence in typical I2C communication systems. For example, each of the I2C slave devices 204 can require patch data that can provide instructions for providing power control of the respective USB port, such as to configure operational data associated with the power control of the USB port or to update existing operational data with system changes associated with the power control of the USB port. Therefore, the burst update provided by the I2C master device 202 to the I2C slave devices 204 is significantly faster and more efficient than sequential updates in typical I2C communication systems.

As an example, the I2C master device 202 can be configured to provide the burst update to each of the I2C slave devices 204 concurrently in a burst update communication session based on accessing each of the I2C slave devices 204 through a burst address. As described herein, the term "burst address" refers to a common non-unique address that is associated with all of the I2C slave devices 204. For example, the I2C master device 204 can initiate the burst update communication session by providing the burst address in a communication stream across the bus 206, such that each of the I2C slave devices 204 can switch from a normal operating mode (e.g., as a processing device, such as to control power delivery to a peripheral I/O port) to a data receive mode in response to being accessed by the I2C master device 202 through the burst address. The I2C master device 202 can then transmit burst data to each of the I2C slave devices 204 concurrently over the bus 206, and can conclude the burst update communication session to the I2C slave devices 204 and enter a normal communications operating mode.

In the example of FIG. 2, each of the I2C slave devices 204 includes a random access memory (RAM) 212 configured to store the burst data as it is received. As an example, the I2C slave devices 204 can each be configured to determine the burst data that is intended for the respective I2C slave device 204. For example, the determination can occur either during the burst update communication session or can occur after the burst update communication session. For example, the I2C slave devices 204 can access the burst data from the RAM 212 and can determine the applicable burst data on identifiers in the burst data that can identify each of the I2C slave devices 204 individually, such as based on hard-coded (e.g., in firmware) identifiers of the respective I2C slave devices 204, or from any of a variety of other manners of identifying the respective I2C slave device 204 (e.g., dual inline package (DIP)-switches, grounding resistors, or other hardware-selective identifiers). Therefore, a given one of the I2C slave devices 204 can process the burst data that is intended to the respective I2C slave device 204, and can discard the rest of the burst data from the RAM 212.

In the example of FIG. 2, each of the I2C slave devices 204 includes a first unique address 214 ("ADDR 1") and a second configurable address 216 ("ADDR 2"). The first unique address 214 can be an address that uniquely identifies the respective I2C slave device 204 and can be static, and thus hard-coded (e.g., in firmware or stored non-volatile memory). The second configurable address 216 can also be an address that identifies the respective I2C slave device 204, but can be a dynamic address that can be software configurable. For example, the I2C master device 202 can initiate individual address configuration communication sessions to each of the I2C slave devices 204 in a sequence using the first unique address 214. During each of the address configuration communication sessions, the I2C master device 202 can provide address configuration data to the respective one of the I2C slave devices 204. The address configuration data can include instructions for the respective I2C slave device 204 to set the second configurable address 216 to the burst address. Therefore, in response to the sequence of address configuration communication sessions to each of the respective I2C slave devices 204, each of the I2C slave devices 204 can have the second configurable address set to the burst address to allow the I2C master device 202 to subsequently initiate a burst update communication session to each of the I2C slave devices 204 concurrently.

Upon conclusion of the burst update communication session, the second configurable address 216 of each of the I2C slave devices 204 can remain set to the burst address, such as to facilitate future burst updates in an efficient manner. Alternatively, the I2C master device 202 can be configured to change the second configurable address 216 of each of the I2C slave devices 204 to a different address, such as by returning the second configurable address 216 to a default address, which may be different for each of the I2C slave devices 204. As a first example, the I2C master device 202 can be configured to provide additional address data to each of the I2C slave devices 204 in the burst data associated with the burst update. The additional address data can provide instructions for each of the I2C slave devices 204 to set the second configurable address of each of the respective I2C slave devices 204 from the burst address to a different address, such as a respective default address, before concluding the burst update communication session from the I2C master device 202 to the I2C slave devices 204. For example, as described herein, the address data can correspond to a control bit or byte that corresponds to automatically setting the address back to a hardware selected address at the conclusion of the burst update.

As another example, the I2C master device 202 can initiate additional address configuration communication sessions to each of the I2C slave devices 204 individually in a sequence through the respective first unique address 214 of each of the I2C slave devices 204. During the additional address configuration communication sessions, the I2C master device 202 can provide additional address data to each of the I2C slave devices 204 individually in the sequence to set the second configurable address 216 of each of the respective I2C slave devices 204 from the burst address to the different address (e.g., the respective default address). The I2C master device 202 could thus conclude the additional address configuration communication session before proceeding with the next additional address communication session in the sequence.

Figure 3:
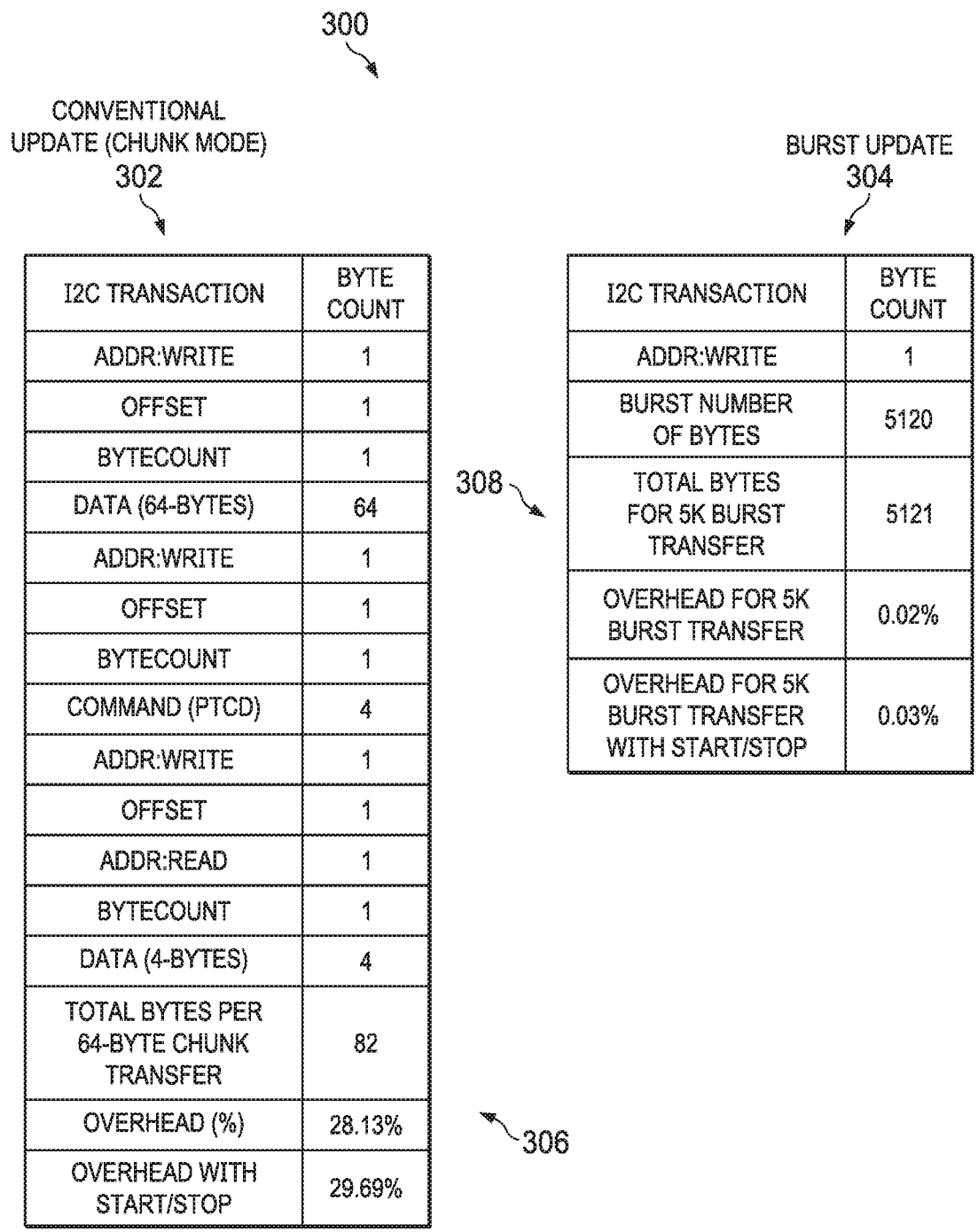
FIG. 3 illustrates an example diagram of updates.

As described previously, the burst update can be provided in a much more rapid and efficient manner than providing individual patch and/or configuration updates to each of the I2C slave devices 204 in a sequence. FIG. 3 illustrates an example diagram 300 of updates. The updates 300 are demonstrated as a first update 302 corresponding to a conventional update for updating an individual I2C slave device, and a second update 304 corresponding to a burst update for updating the I2C slave devices 204 concurrently. The burst update can thus correspond to the burst update described previously with reference to the example of FIG. 2. Therefore, reference is to be made to the example of FIG. 2 in the following description of the example of FIG. 3.

In the example of FIG. 3, the first update 302 (hereinafter "individual chunk update") corresponds to a sequence of transmitted data bytes from an I2C master device to a given one of a plurality of I2C slave devices, such that the individual chunk update 302 is repeated for each of the I2C slave devices sequentially in each of the respective updates. The individual chunk update 302 demonstrates separate single bytes for each of a write address ("ADDR:WRITE"), an offset ("OFFSET"), and a byte count ("BYTECOUNT"). The portion of the individual chunk update 302 that includes the write address, the offset, and the byte count can correspond to a system management bus (SMBus) communication protocol format for addressing registers over I2C. The individual chunk update 302 then includes a predetermined number of data bytes ("DATA (64-BYTES)"), demonstrated in the example of FIG. 3 as sixty-four data bytes, which can correspond to a maximum data transfer in a "chunk" for typical I2C communications. The individual chunk update 302 then includes separate single bytes for each of another write address ("ADDR:WRITE"), another offset ("OFFSET"), and another byte count ("BYTECOUNT"), followed by four bytes of command data ("COMMAND (PTCD)") corresponding to a command to instruct an associated controller (e.g., that implements the I2C communication system) to interpret the 64 byte chunk data as a patch download to an I2C slave device. The individual chunk update 302 then includes separate single bytes again for each of yet another write address ("ADDR:WRITE"), another offset ("OFFSET"), a read address ("ADDR:READ"), and another byte count ("BYTECOUNT"), followed by four more bytes of data ("DATA (4-BYTES)") corresponding to a check by the I2C master device to ensure that the PTCD command data is complete before initiating another chunk download. The individual chunk update 302, as demonstrated at 306, thus includes eighty-two total transmitted bytes for a sixty-four byte transmission of update data. Such an update thus provides for 28.13% of the total transmitted bytes as corresponding to overhead for the individual chunk update 302, or 29.69% corresponding to overhead including the start and stop bytes.

By contrast, the second update 304 (hereinafter "burst update") is similar to the burst update described previously in the example of FIG. 2. Therefore, the burst update 304 can be transmitted by the I2C master device 202 to each of the I2C slave devices 204 concurrently in a more efficient manner by eliminating the transmission of overhead bytes to each of the I2C slave devices 204 in sequential individual updates. For example, because the burst update 304 is transmitted to each of the I2C slave devices 204 concurrently to the burst address that has been programmed in the second configurable address of each of the I2C slave devices 204 on the bus, the burst update 304 does not need to include data that distinguishes characteristics of the update to a single one of the I2C slave devices. In the example of FIG. 3, the second update 304 includes a write address ("ADDR:WRITE") that can correspond to the burst address, and which can constitute the only overhead that is transmitted in the burst update 304, along with "5k" bytes of data ("BURST NUMBER OF BYTES", e.g., 5120 bytes). Therefore, as demonstrated at 308, the burst update 304 includes a total of 5121 total transmitted bytes, resulting in an overhead percentage of 0.02%, or 0.03% corresponding to overhead including the start and stop bytes. Accordingly, the burst update 304 is significantly more efficient than the individual chunk update 302, resulting in a significant time savings and reduced bus traffic in updating all of the I2C slave devices 204.

Figure 4:
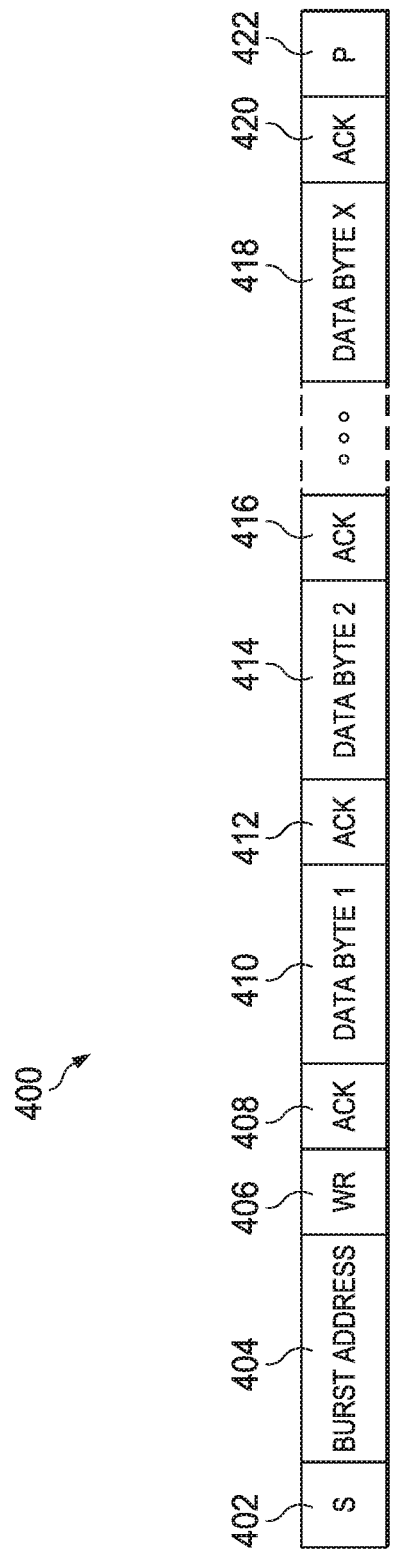
FIG. 4 illustrates an example of a burst update.

FIG. 4 illustrates an example diagram 400 of a burst update communicated on a bus between an I2C master device and I2C slave devices during a burst update communication session 400. The burst update communication session can correspond to the burst update described previously with reference to the example of FIG. 2 or the burst update 304 in the example of FIG. 3. Therefore, reference is to be made to the examples of FIGS. 2 and 3 in the following description of the example of FIG. 4.

The burst update is demonstrated in the diagram 400 as blocks of data arranged time-wise in a sequence. The burst update includes a start bit 402 ("S"), followed by a burst address 404. The burst address 404 can correspond to the burst address 404 that specifies all of the I2C slave devices 204, such as programmed by individual address configuration communication sessions between the I2C master device 202 and each of the I2C slave devices 204. The burst update then includes a write bit 406 ("WRT") that is intended to signify to each of the I2C slave devices 204 that the I2C master device 202 is going to be transmitting data to each of the I2C slave devices 204. In response, the I2C master device 202 can await an acknowledgement 408 ("ACK") that is transmitted from at least one of the I2C slave devices 204. For example, each of the I2C slave devices 204 can be configured to switch the bus 206 to ground to provide the acknowledgement 408. Therefore, the I2C master device 202 can be configured to identify the acknowledgement provided by at least one of the I2C slave devices 204 before proceeding with the burst update.

The I2C master device 202 can then provide a first data byte 410 and can await another acknowledgement 412 provided by at least one of the I2C slave devices 204. The I2C master device 202 can then provide a second data byte 414 and can await yet another acknowledgement 416 provided by at least one of the I2C slave devices 204. The burst update communication session 400 can thus continue to include additional data bytes and acknowledgements, until an Xth data byte 418 corresponding to a last data byte, followed by a last acknowledgement 420. The I2C master device 202 can thus conclude the burst update communication session 400 with an end bit 422 ("P"). Accordingly, as demonstrated in the example of FIG. 4, at least a portion of the data bytes 410, 414, and 418, as well as the data bytes there between, can correspond to all of the I2C slave devices 204. As a result, the I2C slave devices 204 can be updated concurrently by the burst update with minimal overhead in the burst update.

As described previously, each of the I2C slave devices 204 can be configured to provide the acknowledgements (e.g., the acknowledgements 408, 412, 420, etc.). However, the I2C master device 202 may only recognize a single acknowledgement, as provided by at least one of the I2C slave devices 204. Thus, to ensure that each of the I2C slave devices 204 receives the entirety of the burst update in the burst update communication session, upon receiving the end bit 422, each of the I2C slave devices 204 can be configured to perform an error check, such as a cyclic redundancy check (CRC), on the burst data received from the burst update communication session 400 that is stored in the RAM 212. Accordingly, in response to an insufficient transmission of the burst update data, one or more of the I2C slave devices 204 can provide a data message that includes an indication of the insufficient transmission of the burst update data to the I2C master device 202, such that the I2C master device 202 can initiate another burst update communication session.

Similar to as described previously, the data bytes (e.g., the data bytes 410, 414, 418, etc.) can be received by each of the I2C slave devices 204. For example, the burst data can include a first portion of the data bytes that corresponds to global update data is associated with each of the I2C slave devices 204. As an example, the global update data can be implemented by processed by each of the I2C slave devices 204 for providing update information to each of the I2C slave devices 204. The burst data can also include a second portion of the data bytes that corresponds to unique update data that is associated with each of the respective I2C slave devices 204. For example, in the second portion of the burst data, one or more data bytes can be associated with a first one of the I2C slave devices 204, one or more other data bytes can be associated with a second one of the I2C slave devices 204, etc. Each of the I2C slave devices 204 can thus be configured to determine the burst data that is intended for the respective I2C slave device 204. For example, each of the I2C slave devices 204 can determine, either during the burst update communication session 400 or upon receiving the end bit 422, the applicable burst data to be processed, such that the remaining burst data can be discarded from the RAM 212. For example, the I2C slave devices 204 can each determine the applicability of the data based on identifiers within the respective data, as well as based on configuration of the respective I2C slave devices 204 (e.g., based on grounded connections and/or DIP switches).

Figure 5:
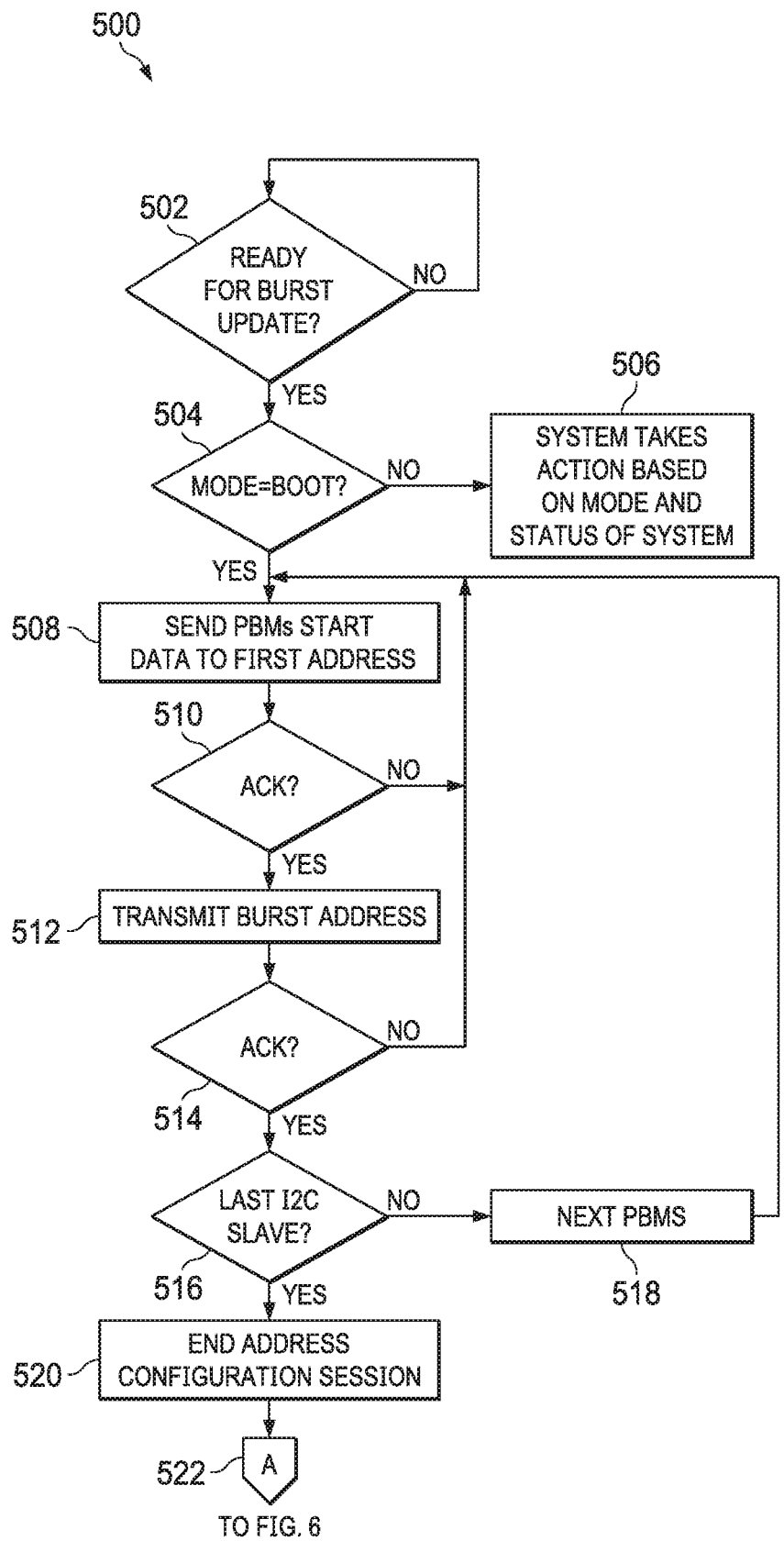
FIG. 5 illustrates an example flow diagram of a first portion of a burst update.
Figure 6:
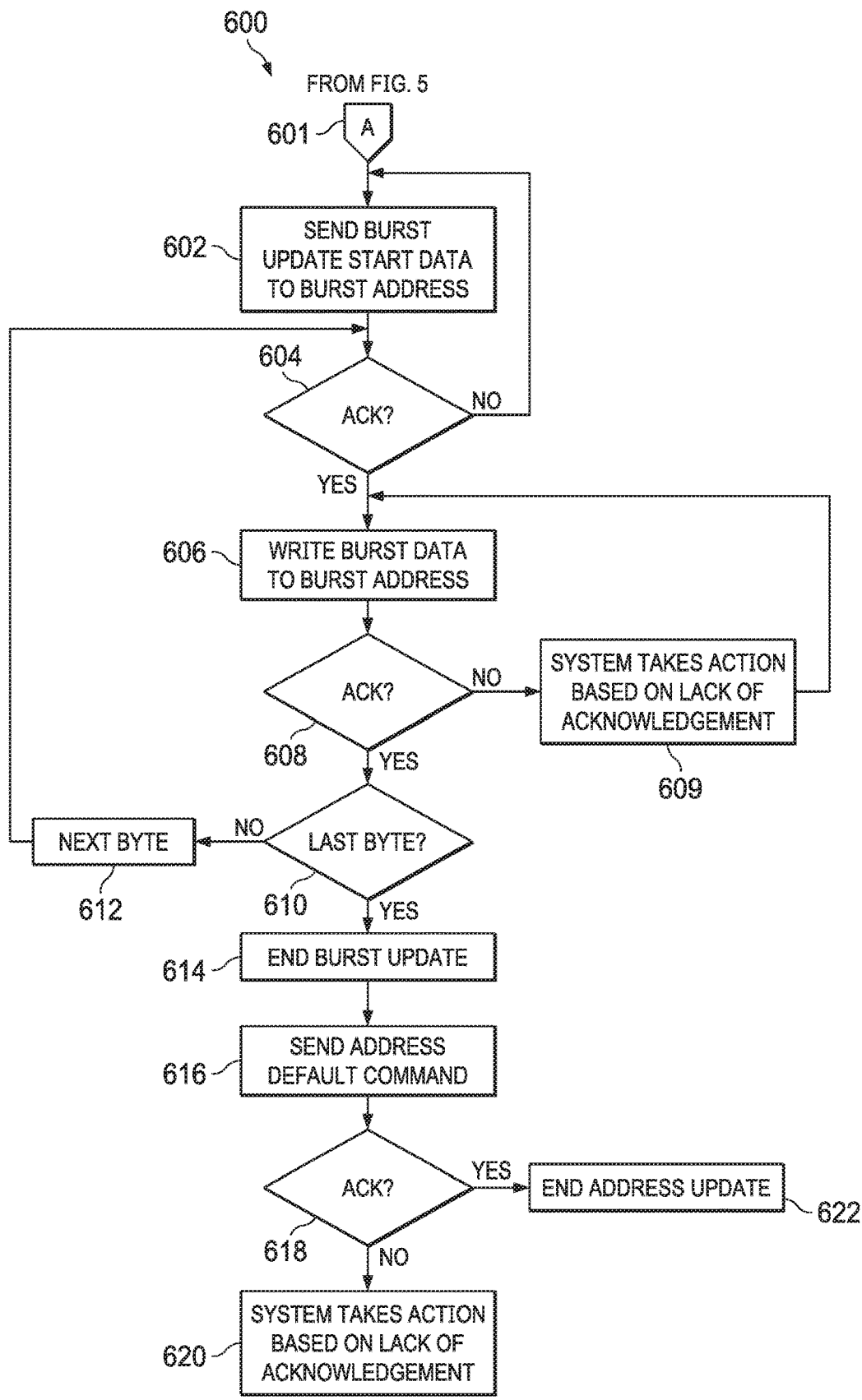
FIG. 6 illustrates an example flow diagram of a second portion of a burst update.

In view of the foregoing structural and functional features described above, methods in accordance with various aspects of the present disclosure will be better appreciated with reference to flow diagrams of FIGS. 5 and 6. While, for purposes of simplicity of explanation, the flow diagrams of FIGS. 5 and 6 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 5 illustrates an example flow diagram 500 of an address configuration communication session, similar to as described previously in the example of FIG. 2. Therefore, reference is to be made to the examples of FIG. 2 in the following description of FIG. 5.

At 502, the method includes determining whether the I2C communication system 200 is ready for a burst update (e.g., in response to the I2C master device 102, 202 receiving a command, such as the signal INST). As an example, the I2C communication system 200 (e.g., by a separate processing element) can initiate an address configuration communication session at the beginning of each time a burst update is desired, or upon initiation (e.g., power-up) of the I2C communication system 200. If the answer is "NO", the flow diagram 500 is maintained at 502. If the answer is "YES", then the flow diagram 500 switches to 504, at which it is determined (e.g., by the signal INST) if the I2C master device 202 is in a boot mode. If the answer is "NO", then the flow diagram switches to 506, at which the I2C communication system 200 can take action based on the mode and status of the I2C communication system 200, such as to provide an indication to a user or to a processing element to switch the mode to a boot mode (e.g., by the signal INST). If the answer is "YES", the flow diagram 500 switches to 508, at which the I2C master device 202 is configured to transmit an address configuration update start data (PBMs), which can be a single bit or multiple bits, to the first unique address 214 of a respective first I2C slave device 204. Therefore, the I2C master device 202 initiates the address configuration communication session with the first I2C slave device 204.

The flow diagram 500 then proceeds to 510, in which the I2C master device 202 awaits an acknowledgement from the respective I2C slave device 204. If the I2C master device 202 does not receive the acknowledgement of accessing the appropriately addressed I2C slave device 204 at 508 ("NO"), the I2C master device 202 can retransmit the PMBs to the I2C slave device 204 (e.g., return to 508). If the I2C master device 202 does receive the acknowledgement ("YES"), the flow diagram 500 proceeds to 512, in which the I2C master device 202 transmits the burst address to the respective I2C slave device 204. For example, the transmission of the burst address can include instructions for the I2C slave device 204 to set the second configurable address 216 to the burst address that is to be associated with the burst update communication session 100. The flow diagram 500 then proceeds to 514, in which the I2C master device 202 awaits an acknowledgement from the respective I2C slave device 204. If the I2C master device 202 does not receive the acknowledgement of the I2C slave device 204 receiving the burst address transmitted at 512 ("NO"), the I2C master device 202 can retransmit the PMBs to the I2C slave device 204 (e.g., return to 508).

If the I2C master device 202 does receive the acknowledgement ("YES"), the flow diagram 500 proceeds to 516, in which the I2C master device 202 determines if the respective address configuration communication session was provided for the last of the I2C slave devices 204 in the sequence. If the address configuration communication session was not with the last of the I2C slave devices 204 ("NO"), the I2C master device 202 proceeds to the next I2C slave device 204 at 518, and returns to 508 at which the I2C master device 202 transmits the burst address to the next respective I2C slave device 204. If the address configuration communication session was with the last of the I2C slave devices 204 ("YES"), the I2C master device 202 proceeds to the state 170 at which the address configuration communication sessions are concluded, and the I2C slave devices 204 are ready to receive a burst update. In the example of FIG. 5, the flow diagram 500 can proceed to 522, at which the I2C communication system 200 can begin a burst update, as described in the example of FIG. 6.

FIG. 6 illustrates an example flow diagram 600 of a burst update communication session, similar to as described previously in the examples of FIGS. 2-4. Therefore, reference is to be made to the examples of FIGS. 2-4 in the following description of FIG. 6. Additionally, reference can be made to the example of FIG. 5 in the following description of the example of FIG. 6. For example, at 601, the I2C communication system can begin the flow diagram based on having just performed the address configuration communication session, as described in the example of FIG. 5. Alternatively, the flow diagram 600 can begin at 602.

At 602, the I2C master device 202 is configured to transmit the burst update start data (e.g., the burst update start bit 402) to the burst address corresponding to the second configurable address 216 of each of the I2C slave devices 204. For example, the burst update start data can be sent in response to instantiation of a burst update, such as in response to the signal INST provided to the master I2C device 202. The flow diagram 600 then proceeds to 604, in which the I2C master device 202 awaits an acknowledgement from at least one of the I2C slave devices 204. If the I2C master device 202 does not receive an acknowledgement of the I2C slave device(s) 204 receiving the burst update start bit, as provided at 602 ("NO"), the I2C master device 202 can retransmit the burst update start bit to the I2C slave devices 204 (e.g., return to 602). If the I2C master device 202 does receive the acknowledgement ("YES"), the flow diagram 600 proceeds to 606, in which the I2C master device 202 begins transmission of the burst data to the respective I2C slave device 204. For example, the transmission of the burst data can be a single byte of the burst data at 606.

The flow diagram 600 then proceeds to 608, in which the I2C master device 202 awaits an acknowledgement from at least one I2C slave device 204 in response to transmitting a data byte of the burst data. If the I2C master device 202 does not receive the acknowledgement of the I2C slave device 204 receiving the data byte of the burst update transmitted at 606 ("NO"), the I2C master device 202 can retransmit the data byte to the I2C slave devices 204 (e.g., return to 606). In the example of FIG. 6, as provided at 609, the I2C communication system 200 can additionally or alternatively take other actions based on a lack of acknowledgement, such as to start the burst update communication session over, to post a fault to a user, or to perform any of a variety of other actions. If the I2C master device 202 does receive the acknowledgement ("YES"), the flow diagram 600 proceeds to 610, in which the I2C master device 202 determines if the transmitted data byte was the last data byte of the burst update. If the transmitted data byte was not the last data byte ("NO"), the I2C master device 202 proceeds to the next data byte at 612, and returns to 606 at which the I2C master device 202 transmits the next data byte in the burst update to each of the I2C slave devices 204. If the transmitted data byte was the last data byte ("YES"), the I2C master device 202 proceeds to 614 at which the burst update communication session is concluded (e.g., based on transmission of an end bit 422).

Additionally, the flow diagram 600 can optionally restore the second configurable address 216 to a different address, such as the default address. At 616, the I2C master device 202 can send a command (e.g., an address default command) to each of the I2C slave devices 204 to restore the second configuration address 216 to the default address (or another address). The flow diagram 600 then proceeds to 618, in which the I2C master device 202 awaits an acknowledgement from at least one I2C slave device 204 in response to transmitting the address default command. If the I2C master device 202 does not receive the acknowledgement of the I2C slave device(s) 204 receiving the address default command at 616 ("NO"), the flow diagram 600 proceeds to 620 at which the I2C master device 202 can take action based on the lack of acknowledgement, such as to retransmit the address default command, to post a fault to a user, or to perform any of a variety of other actions. If the I2C master device 202 does receive the acknowledgement ("YES"), the flow diagram 600 proceeds to 622, at which the flow diagram 600 concludes the address update, such that the I2C communication system 200 is restored to an initial state. The address update demonstrated at 616, 618, 620, and 622 can be implemented either immediately after the conclusion of the burst update at 614, or can be implemented at a later time, such as depending on the state of the associated computer system (e.g., in response to the signal INST).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory storage medium storing a set of instructions, which upon being implemented by a processing element cause the processing element to:
   initiate a burst update communication session from a master microcontroller device on a bus;
   provide a burst address in the burst update communication session from the master microcontroller device to slave microcontroller devices on the bus, the slave microcontroller devices on the bus having a burst address to concurrently activate the slave microcontroller devices to read data;
   provide burst data corresponding to a burst update from the master microcontroller device to the slave microcontroller devices on the bus based on the burst address;
   conclude the burst update communication session from the master microcontroller device to the slave microcontroller devices on the bus; and
   wherein the instructions to provide the burst data include instructions to provide a first portion of the burst data that corresponds to global update data is associated with each of the slave microcontroller devices, and provide a second portion of the burst data that corresponds to unique update data that is associated with each of the respective slave microcontroller devices.

2. The medium of claim 1, wherein the master microcontroller device is configured as an Inter-Integrated Circuit (I2C) master device, and wherein the slave microcontroller devices are configured as I2C slave devices.

3. The medium of claim 1, wherein the instructions further cause the processing element to store the burst update in a random access memory (RAM) of each of the slave microcontroller devices.

4. The medium of claim 3, wherein the instructions further cause the processing element to:
   determine the burst data intended for a respective one of the slave microcontroller devices from the burst update stored in the RAM at the respective one of the slave microcontroller devices;
   process the burst data intended for the respective one of the slave microcontroller devices at the respective one of the slave microcontroller devices; and
   discard remaining burst data from the burst update at the respective one of the slave microcontroller devices.

5. The medium of claim 1, wherein the instructions further cause the processing element to initiate a cyclic redundancy check (CRC) of the burst update at each of the slave microcontroller devices on the bus to determine errors in the burst update.

6. The medium of claim 1, wherein the instructions to provide the burst data comprise instructions to concurrently provide a plurality of bytes of burst data in a sequence to each of the slave microcontroller devices on the bus, wherein the instructions further cause the processing element to transmit an acknowledgement from at least one of the slave microcontroller devices in response to receiving at least a portion of the bytes of burst data.

7. A non-transitory storage medium storing a set of instructions, which upon being implemented by a processing element cause the processing element to:
- initiate a burst update communication session from a master microcontroller device on a bus;
- provide a burst address in the burst update communication session from the master microcontroller device to slave microcontroller devices on the bus, the slave microcontroller devices on the bus having a burst address to concurrently activate the slave microcontroller devices to read data;
- provide burst data corresponding to a burst update from the master microcontroller device to the slave microcontroller devices on the bus based on the burst address;
- conclude the burst update communication session from the master microcontroller device to the slave microcontroller devices on the bus; and
- wherein each of the slave microcontroller devices comprises a first unique address and a second configurable address, wherein the instructions further cause the processing element to:
  - initiate an address configuration communication session from the master microcontroller device to each of the slave microcontroller devices on the bus individually in a sequence using the respective first unique address of each of the slave microcontroller devices;
  - provide address data to each of the slave microcontroller devices on the bus individually in the sequence in each of the respective address configuration communication sessions to set the second configurable address of each of the respective slave microcontroller devices on the bus from a respective default address to the burst address; and
  - conclude each of the address configuration communication sessions prior to initiating the burst update communication session.

8. The medium of claim 7, wherein the instructions further cause the processing element to provide additional address data to each of the slave microcontroller devices on the bus in the burst data associated with the burst update to set the second configurable address of each of the respective slave microcontroller devices on the bus from the burst address to a respective default address before concluding the burst update communication session from the master microcontroller device to the slave microcontroller devices on the bus.

9. The medium of claim 7, wherein the instructions further cause the processing element to:
- initiate additional address configuration communication sessions from the master microcontroller device to each of the slave microcontroller devices on the bus individually in a given sequence via the respective first unique address of each of the slave microcontroller devices;
- provide additional address data to each of the slave microcontroller devices on the bus individually in the given sequence in each of the respective address configuration communication sessions to set the second configurable address of each of the respective slave microcontroller devices on the bus from the burst address to a respective default address; and
- conclude each of the additional address configuration communication sessions in the given sequence.

10. An Inter-Integrated Circuit (I2C) communication system comprising:
- a plurality of I2C slave devices, each of the I2C slave devices comprising a communications port accessible via a common burst address;
- an I2C master device coupled to the I2C slave devices by a bus, the master I2C device being configured to initiate a burst update communication session to each of the I2C slave devices on the bus based on the common burst address, the burst update communication session comprising transmitting burst data corresponding to a burst update to each of the I2C slave devices on the bus concurrently during the burst update communication session; and
- wherein each of the I2C slave devices on the bus comprises a first unique address and a second configurable address wherein the I2C master device is configured to initiate address configuration communication sessions from the I2C master device to each of the I2C slave devices on the bus individually in a sequence via the respective first unique address of each of the I2C slave devices on the bus, to provide address data to each of the I2C slave devices on the bus individually in the sequence in each of the respective address configuration communication sessions to set the second configurable address of each of the respective I2C slave devices on the bus from a respective default address to the burst address, and to conclude each of the address configuration communication sessions prior to initiating the burst update communication session.

11. The system of claim 10, wherein each of the I2C slave devices comprises a random access memory (RAM) configured to store the burst data, each of the I2C slave devices being configured to determine the burst data intended for the respective one of the I2C slave devices from the burst update stored in the RAM, to process the burst data associated with the respective one of the I2C slave devices, and to discard remaining burst data.

12. The system of claim 10, wherein the burst data comprises a plurality of bytes in a sequence, wherein at least one of the I2C slave devices is configured to transmit an acknowledgement in response to receiving at least a portion of the bytes of burst data.

13. A power controller comprising the I2C communication system of claim 10, the power controller corresponding to control of a peripheral input/output (I/O) port of an electronic device.

14. An Inter-Integrated Circuit (I2C) communication system comprising:
- a plurality of I2C slave devices, each of the I2C slave devices comprising a communications port accessible via a common burst address;
- an I2C master device coupled to the I2C slave devices by a bus, the master I2C device being configured to initiate a burst update communication session to each of the I2C slave devices on the bus based on the common burst address, the burst update communication session comprising transmitting burst data corresponding to a burst update to each of the I2C slave devices on the bus concurrently during the burst update communication session; and
- wherein the burst data comprises:
  - a first portion that corresponds to global update data associated with each of the I2C slave devices on the bus; and
  - a second portion that comprises unique update data that is associated with each of the I2C slave devices on the bus.

15. A power controller comprising:

a bus;

a plurality of Inter-Integrated Circuit (I2C) slave devices coupled to the bus, each of the I2C slave devices comprising a communications port accessible via a common burst address;

an I2C master device coupled to the bus, the master I2C bus being configured to initiate a burst update communication session to each of the I2C slave devices on the bus based on the common burst address, the burst update communication session comprising transmitting burst data corresponding to a burst update to each of the I2C slave devices concurrently during the burst update communication session; and wherein each of the I2C slave devices comprises a first unique address and a second configurable address wherein the I2C master device is configured to initiate address configuration communication sessions from the I2C master device to each of the I2C slave devices on the bus individually in a sequence via the respective first unique address of each of the I2C slave devices, to provide address data to each of the I2C slave devices on the bus individually in the sequence in each of the respective address configuration communication sessions to set the second configurable address of each of the respective I2C slave devices from a respective default address to the burst address, and to conclude each of the address configuration communication sessions prior to initiating the burst update communication session.

16. The system of claim 15, wherein each of the I2C slave devices comprises a random access memory (RAM) configured to store the burst data, each of the I2C slave devices being configured to determine the burst data associated with the respective one of the I2C slave devices from the burst update stored in the RAM, to process the burst data associated with the respective one of the I2C slave devices, and to discard remaining burst data.

17. A power controller comprising:

a bus;

a plurality of Inter-Integrated Circuit (I2C) slave devices coupled to the bus, each of the I2C slave devices comprising a communications port accessible via a common burst address;

an I2C master device coupled to the bus, the master I2C bus being configured to initiate a burst update communication session to each of the I2C slave devices on the bus based on the common burst address, the burst update communication session comprising transmitting burst data corresponding to a burst update to each of the I2C slave devices concurrently during the burst update communication session; and wherein the burst data comprises:

a first portion that corresponds to global update data associated with each of the I2C slave devices; and a second portion that comprises unique update data that is associated with each of the I2C slave devices.

* * * * *